(12) United States Patent
Ai

(10) Patent No.: US 10,597,226 B2
(45) Date of Patent: Mar. 24, 2020

(54) FLOAT AND EVAPORATION SUPPRESSING METHOD

(71) Applicant: FANUC CORPORATION, Yamanashi (JP)

(72) Inventor: Minjie Ai, Yamanashi-ken (JP)

(73) Assignee: FANUC CORPORATION, Yamanashi (JP)

( * ) Notice: Subject to any disclaimer, the term of this patent is extended or adjusted under 35 U.S.C. 154(b) by 46 days.

(21) Appl. No.: 15/896,222

(22) Filed: Feb. 14, 2018

(65) Prior Publication Data

US 2018/0229928 A1  Aug. 16, 2018

(30) Foreign Application Priority Data

Feb. 16, 2017 (JP) .................. 2017-026566

(51) Int. Cl.
| | | |
|---|---|---|
| B65D 90/42 | (2006.01) | |
| B65D 88/36 | (2006.01) | |
| B01J 19/16 | (2006.01) | |
| B01J 19/08 | (2006.01) | |
| B65D 88/34 | (2006.01) | |
| B65D 88/44 | (2006.01) | |

(52) U.S. Cl.
CPC ............ *B65D 90/42* (2013.01); *B01J 19/087* (2013.01); *B01J 19/16* (2013.01); *B65D 88/34* (2013.01); *B65D 88/36* (2013.01); *B65D 88/44* (2013.01)

(58) Field of Classification Search
CPC ..................................................... B65D 90/42
See application file for complete search history.

(56) References Cited

U.S. PATENT DOCUMENTS

| | | | |
|---|---|---|---|
| 3,938,338 A | 2/1976 | Cullen | |
| 6,199,428 B1 * | 3/2001 | Estevez-Garcia | ....... G01F 23/36 200/84 C |
| 2004/0134847 A1 | 7/2004 | Lin | |
| 2015/0060358 A1 | 3/2015 | Bleggi | |

FOREIGN PATENT DOCUMENTS

| | | |
|---|---|---|
| CN | 204037870 U | 12/2014 |
| JP | 5146423 A | 4/1976 |
| JP | 5190021 A | 8/1976 |
| JP | 5459617 A | 5/1979 |
| JP | 5549091 U | 3/1980 |
| JP | 56137733 U | 10/1981 |
| JP | 61134999 U | 8/1986 |

(Continued)

OTHER PUBLICATIONS

English Abstract and Machine Translation for Japanese Publication No. 54-59617 A, published May 14, 1979, 6 pgs.

(Continued)

*Primary Examiner* — Donald R Spamer
(74) *Attorney, Agent, or Firm* — Fredrikson & Byron, P.A.

(57) ABSTRACT

A float floating in a liquid has a spherical body having a spherical shape from which parts are cut off so as to form a regular hexagonal shape when viewed from one direction. In addition, the float is shaped so as to form a regular hexagonal shape when viewed from the above-mentioned one direction, and the floats are arranged in a honeycomb geometry to thereby reduce the contact area between the liquid and air.

9 Claims, 5 Drawing Sheets

(56) References Cited

FOREIGN PATENT DOCUMENTS

| JP | 2004188330 A | 7/2004 |
|---|---|---|
| JP | 2004225156 A | 8/2004 |
| JP | 201220361 A | 2/2012 |
| JP | 201314369 A | 1/2013 |
| JP | 201335548 A | 2/2013 |
| JP | 201469886 A | 4/2014 |
| JP | 5726657 B2 | 6/2015 |
| KR | 100770645 B1 | 11/2007 |

OTHER PUBLICATIONS

English Machine Translation for Japanese Publication No. 61-134999 U, published Aug. 22, 1986, 3 pgs.
English Machine Translation for Japanese Publication No. 51-090021 A, published Aug. 6, 1976, 6 pgs.
English Machine Translation for Japanese Publication No. 56-137733 U, published Oct. 19, 1981, 6 pgs.
English Abstract and Machine Translation for Japanese Publication No. 2013-014369 A, published Jan. 24, 2013, 9 pgs.
Untranslated Decision to Grant a Patent mailed by Japan Patent Office (JPO) for Application No. JP 2017-026566, dated Nov. 27, 2018, 3 pgs.
English machine translation of Decision to Grant a Patent mailed by Japan Patent Office (JPO) for Application No. JP 2017-026566, dated Nov. 27, 2018, 3 pgs.
Untranslated Notification of Reasons for Refusal a Patent mailed by Japan Patent Office (JPO) for Application No. JP 2017-026566, dated Aug. 21, 2018, 3 pgs.
English machine translation of Notification of Reaons for Refusal a Patent mailed by Japan Patent Office (JPO) for Application No. JP 2017-026566, dated Aug. 21, 2018, 3 pgs.
English Abstract of Chinese Publication No. 204037870 U, published Dec. 24, 2014, 1 pg.
Untranslated First Office Action mailed by State Intellectual Property Office of China (SIPO) for corresponding Chinese Jatent Application No. 201810152194.5 dated Mar. 5, 2019, and partial English translation of Chinese Search Report mailed by SIPO for corresponding Chinese Patent Application No. 201810152194.5 dated Feb. 22, 2019, 5 pgs.
English Machine Translation of First Office Action mailed by State Intellectual Property Office of China (SIPO) for aorresponding Chinese Patent Application No. 201810152194.5 dated Mar. 5, 2019, 4 pgs.
English Abstract and Machine Translation for Japanese Publication No. 5726657 B2, published Jun. 3, 2015, 8 pgs.
English Abstract and Machine Translation for Japanese Publication No. 2013-035548 A, published Feb. 21, 2013, 6 pgs.
English Abstract and Machine Translation for Japanese Publication No. 56-137733 U, published Oct. 19, 1981, 6 pgs.
English Abstract and Machine Translation for Japanese Publication No. 2014-069886 A, published Apr. 2, 2014, 6 pgs.
English Abstract and Machine Translation for Japanese Publication No. 2004-188330 A, published Jul. 8, 2004, 11 pgs.
English Abstract and Machine Translation for Korean Publication No. 100770645 B1, published Nov. 2, 2007, 8 pgs.
Extended European Search Report dated Jun. 29, 2018 for related EP Application No. 18156897.3, 8 pgs.
English Machine Translation for Japanese Publication No. 51-46423 A, published Apr. 20, 1976, 3 pgs.
English Machine Translation for Japanese Publication No. 55-49091 U, published Mar. 31, 1980, 3 pgs.
English Abstract and Machine Translation for Japanese Publication No. 2012-020361 A, published Feb. 2, 2012, 12 pgs.
English Abstract and Machine Translation for Japanese Publication No. 2004-225156 A, published Aug. 12, 2004, 5 pgs.
English Machine Translation for Japanese Publication No. JPS5459617 A, published May 14, 1979, 6 pgs.

\* cited by examiner

FLOAT AND EVAPORATION SUPPRESSING METHOD

CROSS-REFERENCE TO RELATED APPLICATION

This application is based upon and claims the benefit of priority from Japanese Patent Application No. 2017-026566 filed on Feb. 16, 2017, the contents of which are incorporated herein by reference.

BACKGROUND OF THE INVENTION

Field of the Invention

The present invention relates to a float that floats in a liquid and an evaporation suppressing method for suppressing evaporation of the liquid by using the floats.

Description of the Related Art

Japanese Laid-Open Patent Publication No. 2004-225156 discloses a configuration in which multiple hexagonal columnar floating bodies are floated in a plating solution in order to suppress evaporation of the plating solution.

SUMMARY OF THE INVENTION

However, when the floating bodies described in Japanese Laid-Open Patent Publication No. 2004-225156 are put into a tank storing a liquid, multiple hexagonal floating bodies may overlap with each other with respect to the vertical direction of the liquid surface. Thus, it is impossible to effectively cover the surface (liquid surface) of the liquid with the floating bodies. Hence, in order to reduce the contact area between the liquid and the air, extra floating bodies have to be added to the tank.

It is therefore an object of the present invention to provide a float that floats in a liquid without overlapping with others and an evaporation suppressing method for suppressing evaporation of the liquid using the floats.

According to a first aspect of the present invention, a float that floats in a liquid includes a spherical body having a spherical shape from which parts are cut off so as to form a regular hexagonal shape when viewed from one direction.

According to a second aspect of the present invention, an evaporation suppressing method includes a step of floating the multiple floats defined in the above first aspect in the liquid and arraying the floats in a honeycomb geometry to thereby reduce the contact area between the liquid and the air.

According to the present invention, multiple floats can be floated in a liquid so as not to overlap with each other in the direction orthogonal to the liquid surface. In addition, since the float is shaped so as to form a regular hexagonal shape when viewed from one direction, multiple floats can be arrayed in the honeycomb geometry so as to reduce the contact area between the liquid and the air. As a result, it is possible to suppress evaporation of the liquid.

The above and other objects features and advantages of the present invention will become more apparent from the following description when taken in conjunction with the accompanying drawings in which a preferred embodiment of the present invention is shown by way of illustrative example.

DESCRIPTION OF THE PREFERRED EMBODIMENTS

A float and an evaporation suppressing method according to the present invention will be detailed hereinbelow by describing preferred embodiments with reference to the accompanying drawings.

Figure 1:
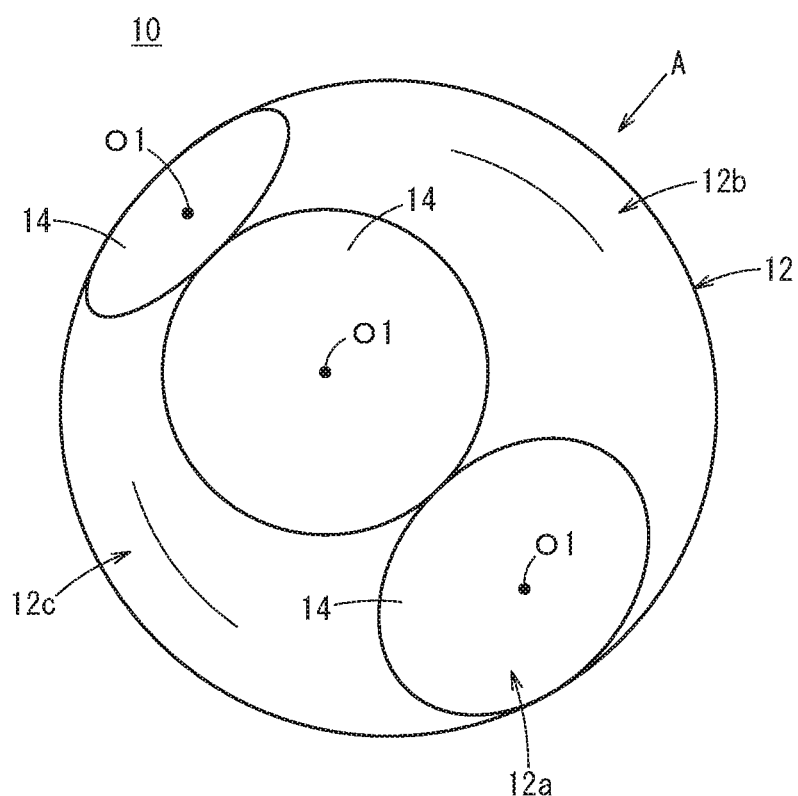
FIG. 1 is an external perspective view of a float.
Figure 2:
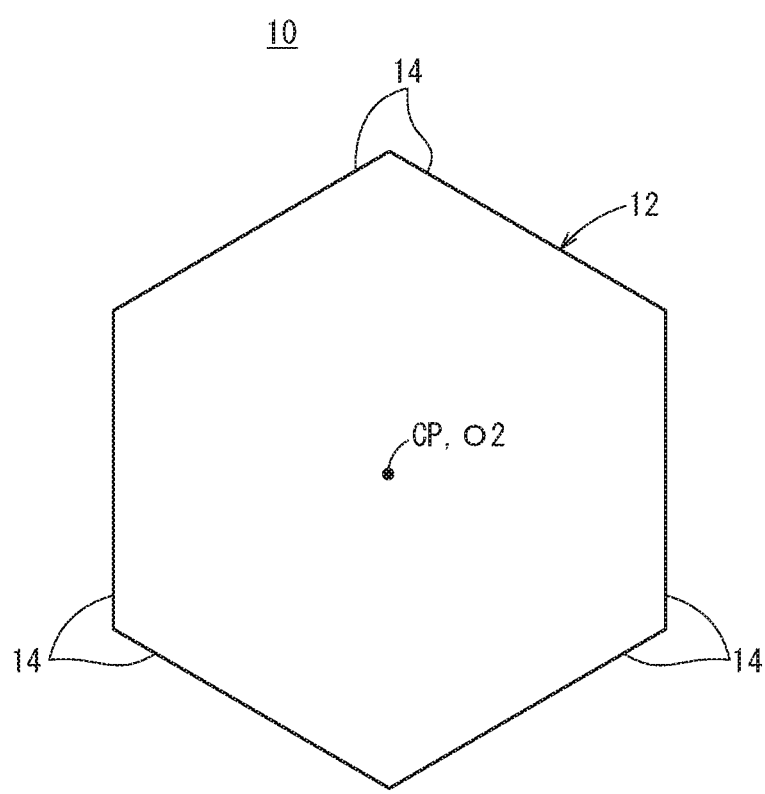
FIG. 2 is an external side view of the float as viewed from the direction of an arrow A.
Figure 3:
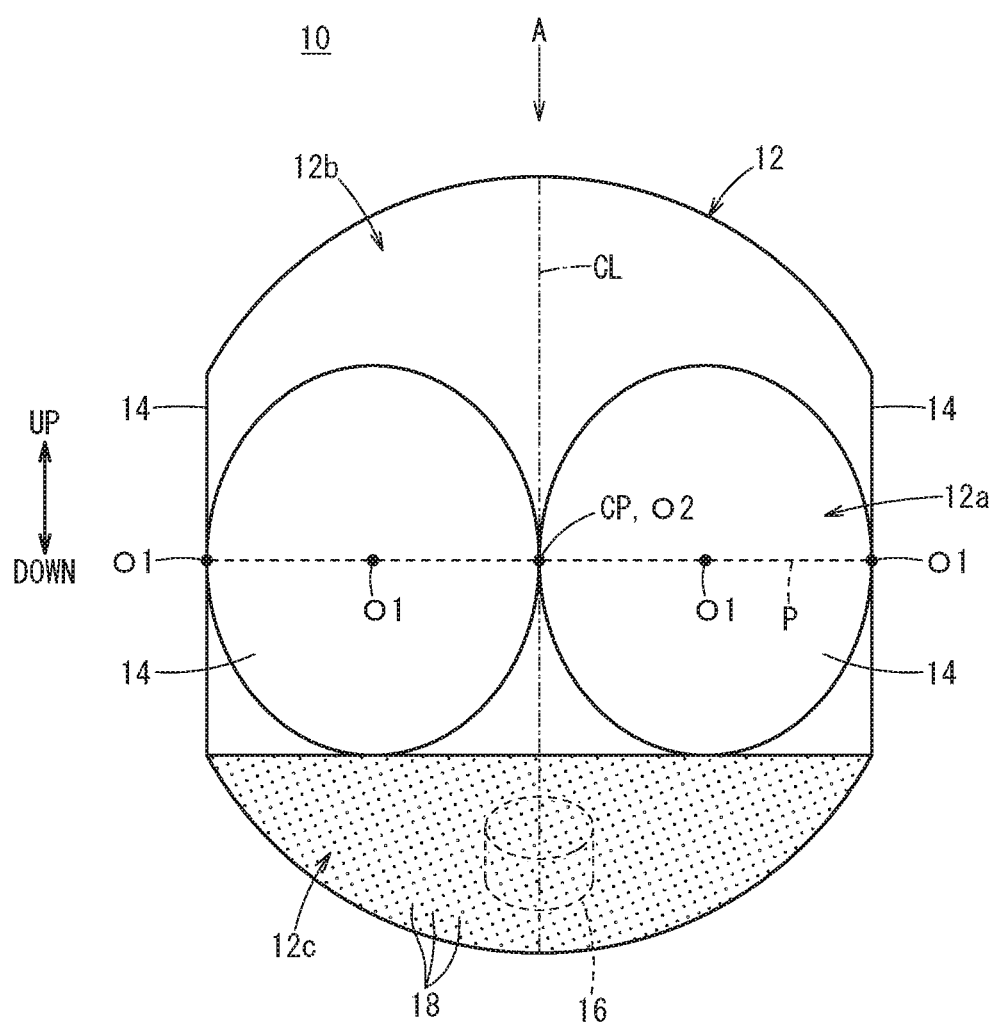
FIG. 3 is an external side view of the float as viewed from a direction orthogonal to the direction of the arrow A.

FIG. 1 is an external perspective view of a float 10, FIG. 2 is an external side view of the float 10 as viewed from the direction of an arrow A, and FIG. 3 is an external side view of the float 10 as viewed from a direction orthogonal to the direction of the arrow A. Note that the vertical direction (up-and-down direction) will be defined on the basis of the direction of the arrow shown in FIG. 3. The vertical direction is parallel to the direction of the arrow A, and the direction of the arrow A corresponds to the downward direction.

Now, a usage example of the float 10 will be described. An unillustrated electrical discharge machine (e.g., a wire electrical discharge machine) includes a tank or a pan that stores a liquid. Evaporation of the liquid can be suppressed by floating a plurality of floats 10 in the liquid stored in the pan. In general, the electrical discharge machine includes a work-pan for storing a liquid (dielectric working fluid) used for electrical discharge machining, a contamination-pan for storing a liquid contaminated by sludge (machined chips) caused during electrical discharge machining, and a clean-pan for storing a clean liquid obtained by removing sludge from the contaminated liquid. Accordingly, the floats 10 are used to suppress the evaporation of the liquid stored in at least one of the work-pan, the contamination-pan and the clean-pan. Note that this float 10 can be also used to suppress evaporation of a liquid (for example, a developing solution, a plating solution or the like) other than the liquid used in the electrical discharge machine.

The float 10 has a spherical body 12 having a spherical shape from which parts are cut off to form a regular hexagonal shape as viewed from one direction, i.e., the direction of the arrow A (see FIG. 2). In other words, the float 10 has a regular hexagonal shape when viewed from the direction of the arrow A, by cutting away portions. This spherical body 12 forms the external appearance of the float 10.

The spherical body 12 has six lateral sides 14 formed thereon, and which define the regular hexagonal shape. The six lateral sides 14 lie parallel to the direction of the arrow A (the vertical direction). That is, all the six lateral sides 14 are orthogonal to a plane P that is perpendicular to the direction of the arrow A (see FIG. 3). The plane P is a plane passing through a center point CP of the spherical body 12. The six lateral sides 14 are of circular shapes with their centers O1 located on the plane P. The center O2 of the inscribed circle and the circumscribed circle of the regular hexagonal shape defined by the six lateral sides 14 coincides with the center point CP (see FIGS. 2 and 3).

The center of gravity of the float 10 is set at a position shifted from the center point CP along the center line CL (see FIG. 3) that passes through the center point CP of the spherical body 12 in parallel to the direction of the arrow A. With this configuration, the float 10 floats in the liquid such that the shape of the float 10 (spherical body 12) is hexagonal when viewed from the direction (normal direction of the liquid surface) perpendicular to the surface of the liquid (liquid surface). That is, the float 10 floats in the liquid such that the perpendicular direction with respect to the liquid surface and the direction of the arrow A coincide with each other within a predetermined allowable range. In the present embodiment, since the center of gravity of the float 10 is set at a position shifted downward from the center point CP along the center line CL, at least a lower portion of the float 10 is immersed in the liquid.

The center of gravity of the float 10 need not be located on the center line CL, but only needs to be shifted from the center point CP in the vertical direction. However, when the float 10 is floated in the liquid, it is necessary to select the position of the center of gravity so that the shape of the float 10 is hexagonal when viewed from the perpendicular direction of the surface (liquid surface) of the liquid.

In the present embodiment, by disposing a weight 16 at a position shifted from the center point CP on the center line CL and inside the spherical body 12, the center of gravity of the float 10 is shifted from the center point CP along the center line CL (see FIG. 3). In this arrangement, it is not necessary that the center of gravity or the center position of the weight 16 is positioned on the center line CL as long as at least part of the weight 16 resides on the center line CL. In the present embodiment, the weight 16 is arranged at a position shifted downward from the center point CP along the center line CL.

Instead of providing the weight 16, by setting the weight of a lower part of the spherical body 12 below the plane P (which will be referred to, hereinbelow, as a substantially lower hemispherical portion) to be heavier than the weight of an upper part above the plane P (which will be referred to, hereinbelow, as a substantially upper hemispherical portion), the center of gravity may be shifted from the center point CP. For example, a hollow cavity formed in the substantially upper hemispherical portion can be made greater than a hollow cavity in the substantially lower hemispherical portion so as to make their weights different from each other.

In addition, a magnet powder 18 is attached to at least part of a surface of the spherical body 12 immersed in the liquid when the float 10 floats in the liquid (see FIG. 3). In the present embodiment, since the lower portion of the spherical body 12 is immersed in the liquid, the magnet powder 18 is attached to the surface of at least the lower portion of the spherical body 12. Metal sludge (machined chips) occurs during electrical discharge machining, which shortens the life time of an ion exchange resin provided in the electrical discharge machine. However, in the present embodiment, by applying the magnet powder 18 to the immersed surface of the spherical body 12 in the liquid, the metal sludge present in the liquid is attracted to the magnet powder 18 applied on the surface of the spherical body 12. As a result, the concentration of the sludge in the liquid is reduced so that it is possible to extend the life time of the ion exchange resin.

Here, the spherical body 12 is divided into three parts along the direction of the arrow A (vertical direction), and one part having the six lateral sides 14 defining the regular hexagonal shape is referred to as a hexagon forming portion 12a. Another part located on the upper side (a side opposite to the direction of the arrow A) and adjacent to the hexagon forming portion 12a is referred to as a first spherical surface portion 12b, and yet another part on the lower side (a side of the direction of the arrow A) and adjacent to the hexagon forming portion 12a is referred to as a second spherical surface portion 12c. In the present embodiment, the weight 16 is disposed in the second spherical surface portion 12c. Therefore, at least part of the surface of the second spherical surface portion 12c is immersed in the liquid, and the magnet powder 18 is attached to at least part of the surface of the second spherical surface portion 12c. FIG. 3 shows an example in which the magnet powder 18 is attached to the entire surface of the second spherical surface portion 12c.

Here, the magnet powder 18 only needs to be attached to at least part of the immersed surface of the spherical body 12 in the liquid. Therefore, the magnet powder 18 may be attached to a surface of the spherical body 12 not immersed in the liquid, or the magnet powder 18 may be attached to the entire surface of the spherical body 12.

Figure 4:
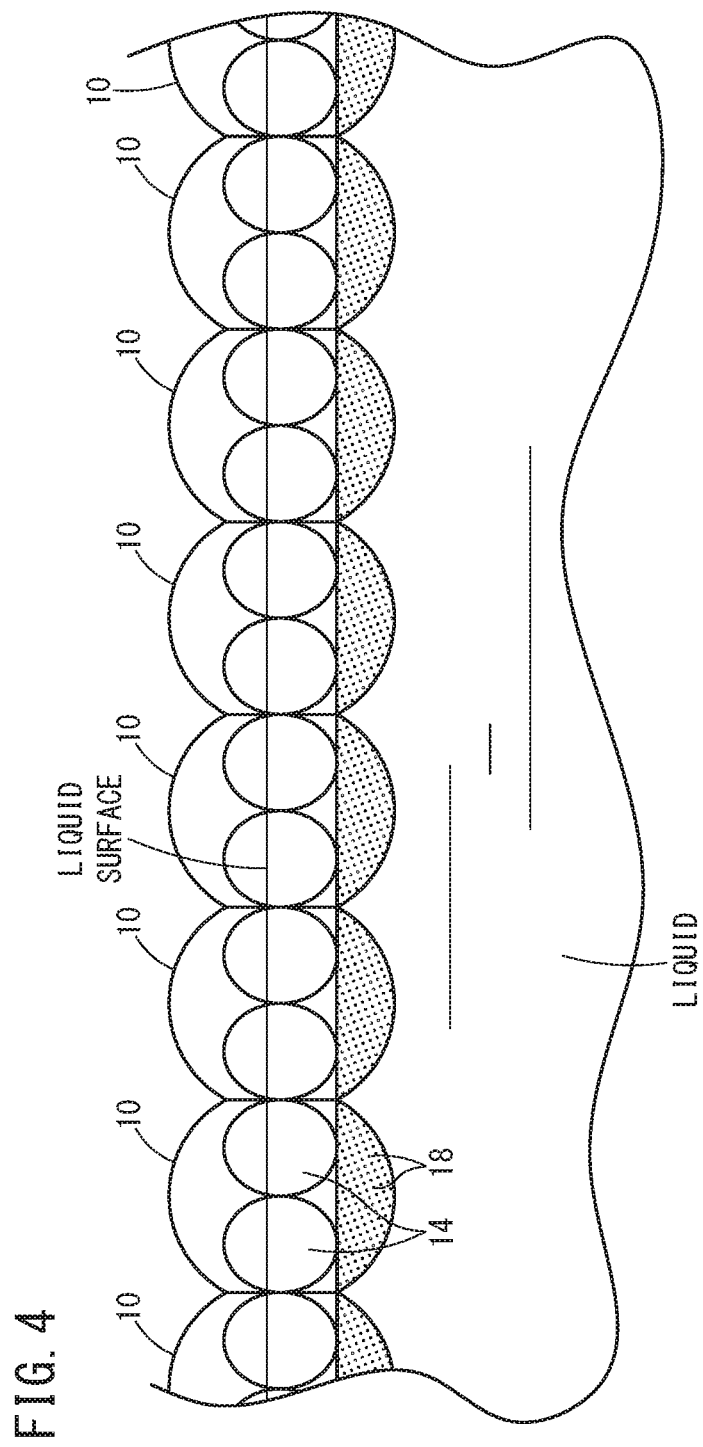
FIG. 4 is a view of a state in which a plurality of floats are floated in a liquid as viewed from a direction parallel to a liquid surface.
Figure 5:
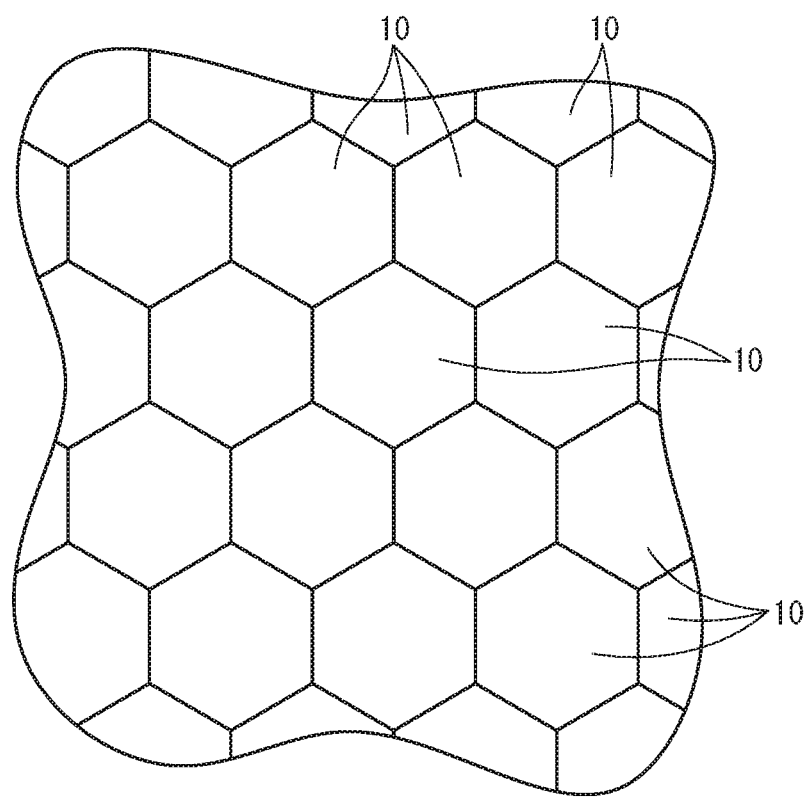
FIG. 5 is a view of a state in which a plurality of floats are floated in a liquid as viewed from a direction orthogonal to the liquid surface.

Because the float 10 has a substantially spherical shape, even when multiple floats 10 are put into a pan, the floats 10 float in liquid without overlapping with each other in the vertical direction, as shown in FIG. 4. Since the center of gravity of the spherical body 12 is shifted from the center point CP of the spherical body 12 along the center line CL, the float 10 floats in the liquid such that the float 10 assumes a hexagonal shape as viewed from the direction perpendicular to the surface of the liquid (liquid surface). Therefore, as shown in FIG. 5, a plurality of floats 10 can be arrayed in a honeycomb geometry so as to eliminate gaps between the floats 10. As a result, the contact area between the liquid and the air can be reduced, whereby it is possible to suppress evaporation of the liquid.

[Modifications]

The above-described embodiment can also be modified as follows.

(Modification 1)

In the above-described embodiment, the position of the center of gravity of the float 10 is shifted from the center point CP of the spherical body 12, but the center of gravity of the float 10 may be positioned at the center point CP. Even in this case, the floats 10 float in the liquid without overlapping with each other in the vertical direction. In addition, since the float 10 is formed in a regular hexagonal shape when viewed from the direction of the arrow A, the floats 10 can be arranged in a honeycomb geometry, and the gaps between the floats 10 can be eliminated. As a result, the contact area between the liquid and the air can be reduced, whereby it is possible to suppress evaporation of the liquid.

(Modification 2)

In the above-described embodiment and Modification 1, the magnet powder 18 is attached to at least part of the immersed surface of the spherical body 12 in the liquid, but the magnet powder 18 need not necessarily be attached.

(Modification 3)

In the above embodiment and Modifications 1 and 2, the magnet powder 18 is attached to the surface of the spherical body 12, but a magnet seal may be applied to the surface of the spherical body 12, instead of the magnet powder 18. In short, any member having magnetic force, i.e., a magnet, may be used.

As described above, a liquid float (10) floating in a liquid, which has been described above in the above embodiment and Modifications 1 to 3, includes a spherical body (12) having a spherical shape from which parts are cut off so as to form a regular hexagonal shape when viewed from one direction (the direction of the arrow A).

This configuration makes it possible to float multiple floats (10) in the liquid so as not to overlap with each other in the vertical direction. In addition, since the float (10) is shaped to form a regular hexagonal shape when viewed from one direction, it is possible to array multiple floats (10) in a honeycomb geometry, so that the gaps between the floats (10) can be eliminated. As a result, the contact area between the liquid and the air can be reduced so as to suppress evaporation of the liquid.

The spherical body (12) may have six lateral sides (14) defining the regular hexagonal shape, and the six lateral sides (14) may be parallel to the one direction. This makes it possible to array multiple floats (10) orderly in the honeycomb geometry, and hence the gaps between the floats (10) can be eliminated. As a result, the contact area between the liquid and the air can be reduced so as to suppress evaporation of the liquid.

The center of gravity of the float (10) may be set at a position shifted from the center point (CP) of the spherical body (12) along a center line (CL) that passes through the center point (CP) in parallel with the one direction. This enables the float (10) to be floated in the liquid so that the float (10) as viewed from a direction orthogonal to the liquid surface (liquid surface) is given a hexagonal-shaped appearance. Therefore, it is possible to arrange multiple floats (10) easily in the honeycomb geometry, and hence the gaps between the floats (10) can be eliminated. As a result, the contact area between the liquid and the air can be reduced so as to suppress evaporation of the liquid.

A weight (16) may be provided at a position shifted from the center point (CP) on the center line (CL) and inside the spherical body (12). This makes it possible to easily shift the center of gravity of the float (10).

A magnet (18) may be attached to at least part of a surface of the spherical body (12) immersed in the liquid when the float (10) is put in the liquid. In this case, the magnet (18) attracts the metal sludge present in the liquid. As a result, the concentration of the sludge in the liquid can be reduced so that it is possible to extend the life time of the ion exchange resin.

The spherical body (12) is made up of a first spherical surface portion (12b), a second spherical surface portion (12c), and a hexagon forming portion (12a) having the six lateral sides (14) defining the regular hexagonal shape and located between the first spherical surface portion (12b) and the second spherical surface portion (12c). The weight (16) may be provided inside the second spherical surface portion (12c). As a result, the float (10) can be floated in the liquid such that the float (10) has a hexagonal shape when viewed from a direction orthogonal to the liquid surface (liquid surface).

A magnet (18) may be attached to at least part of the surface of the second spherical surface portion (12c) having the weight (16) therein. Since the magnet (18) attracts the metal sludge present in the liquid, the concentration of the sludge in the liquid can be reduced so that it is possible to extend the life time of the ion exchange resin.

The magnet (18) may be magnet powder (18) or a magnet seal. In this case, magnetic force can be easily imparted to the surface of the spherical body (12) without greatly changing the external shape of the float (10).

In the evaporation suppressing method described in the above embodiment and Modifications 1 to 3, the multiple floats (10) are floated in the liquid and arrayed in the honeycomb geometry to thereby reduce the contact area between the liquid and the air. As a result, it is possible to suppress evaporation of the liquid.

While the invention has been particularly shown and described with reference to the preferred embodiment, it will be understood that variations and modifications can be effected thereto by those skilled in the art without departing from the scope of the invention as defined by the appended claims.

What is claimed is:

1. A float that floats in a liquid, comprising a spherical body having a spherical shape from which parts are cut off so as to form a regular hexagonal shape when viewed from one direction,
    wherein a center of gravity of the float is set at a position shifted from a center point of the spherical body along a center line that passes through the center point in parallel with the one direction,
    a magnet is attached to at least part of a portion of a surface of the spherical body, wherein the magnet and the portion are immersed in the liquid and is not any one of six side surfaces constituting the regular hexagonal shape, when the float is floated in the liquid.

2. The float according to claim 1, wherein the spherical body has six lateral sides defining the regular hexagonal shape, and the six lateral sides are parallel to the one direction.

3. The float according to claim 1, wherein a weight is provided at a position shifted from the center point on the center line and inside the spherical body.

4. The float according to claim 1, wherein the magnet is magnet powder or a magnet seal.

5. A float that floats in a liquid, comprising a spherical body having a spherical shape from which parts are cut off so as to form a regular hexagonal shape when viewed from one direction,
    wherein:
    the spherical body comprises a first spherical surface portion, a second spherical surface portion,
    and a hexagon forming portion having six lateral sides defining the regular hexagonal shape and located between the first spherical surface portion and the second spherical surface portion;
    a center of gravity of the float is set at a position shifted from a center point of the spherical body by providing a weight at a position shifted from the center point inside the spherical body and on a center line that passes through the center point in parallel with the one direction;
    the weight is provided inside the second spherical surface portion; and
    a magnet is attached to at least part of a portion of the second spherical surface portion having the weight therein, wherein the magnet and the portion are immersed in the liquid and is not any one of six side surfaces constituting the regular hexagonal shape, when the float is floated in the liquid.

6. The float according to claim 5, wherein the magnet is magnet powder or a magnet seal.

7. The float according to claim 5, wherein the spherical body has six lateral sides defining the regular hexagonal shape, and the six lateral sides are parallel to the one direction.

8. An evaporation suppressing method, comprising a step of floating the multiple floats according to claim 1 in the liquid and arraying the floats in a honeycomb geometry to thereby reduce a contact area between the liquid and air.

9. An evaporation suppressing method, comprising a step of floating the multiple floats according to claim 5 in the liquid and arraying the floats in a honeycomb geometry to thereby reduce a contact area between the liquid and air.

\* \* \* \* \*